United States Patent [19]
Sauve

[11] 3,895,548
[45] July 22, 1975

[54] BLENDER PACKING DEVICE

[75] Inventor: Delsford B. Sauve, Ft. Lauderdale, Fla.

[73] Assignee: Lawrence Peska Associates, Inc., New York, N.Y. ; a part interest

[22] Filed: July 29, 1974

[21] Appl. No.: 492,582

[52] U.S. Cl. .................................. 81/1 R; 241/169.2
[51] Int. Cl. .............................................. A47j 43/28
[58] Field of Search ........... 81/1 R; 241/82.1, 169.2, 241/101.2; 30/303

[56] References Cited
UNITED STATES PATENTS

| | | | |
|---|---|---|---|
| 1,104,718 | 7/1914 | Trevisan | 30/303 |
| 1,412,536 | 4/1922 | Mayer | 241/169.2 |
| 2,066,997 | 1/1937 | Mueller | 81/1 R |
| 2,072,793 | 3/1937 | Brennan | 30/303 |
| 2,928,483 | 3/1960 | Trost | 30/303 |
| 3,088,345 | 5/1963 | Campbell | 81/1 R |
| 3,765,275 | 10/1973 | Johnson | 81/1 R |

Primary Examiner—Al Lawrence Smith
Assistant Examiner—Roscoe V. Parker

[57] ABSTRACT

A device for urging food matter into a blender which comprises a first generally planar elongated blade having a plurality of transversely extending fins and a second generally planar elongated blade having a plurality of transversely extending fins. The first and second generally planar elongated blades are fixedly carried at right angles to each other.

9 Claims, 4 Drawing Figures

PATENTED JUL 22 1975　　　3,895,548

3,895,548

BLENDER PACKING DEVICE

BACKGROUND OF THE INVENTION

The field of the invention relates to apparatus for urging food matter into a blender. The prior art includes various plunger devices such as that shown in Mayer, U.S. Pat. No. 1,412,536 issued Apr. 11, 1922. The plunger apparatus shown therein has a generally rounded end for urging foodstuff into a meat grinder.

The apparatus of this general type has not been particularly suitable for blenders since the relatively massive nature thereof would tend to bend the relatively light blades which are typically used in blenders.

Accordingly it is the primary object of the invention to provide apparatus which will facilitate urging foodstuffs into a blender without damaging the blades thereof and which will enable the operator thereof to have maximum visibility of the relationship between the blades of blender and the tool which he is using.

It is the object of the invention to provide apparatus which is simple and inexpensive to manufacture.

SUMMARY OF THE INVENTION

In accordance with the invention in one form a tool is provided for use with the blender which comprises a first generally planar elongated blade having a plurality of transversely extending fins. A second generally planar elongated blade having a plurality of transversely extending fins is carried fixedly at right angles to the first generally planar elongated blade.

In the preferred form each blade has a fin disposed at the same axial position of the assembly. The surface of the blade intermediate each fin may be arcuate and the opposite faces as well as the peripheral portions of the fins may be straight. The blades are preferably made of plastic. Particularly desirable is a Plexiglass or a Lucite.

BRIEF DESCRIPTION OF THE DRAWING

While the specification concludes with claims particularly pointing out and distinctly claiming the subject matter which I regard as my invention, it is believed the invention will be better understood from the following description taken in conjunction with the accompanying drawing which:

DESCRIPTION OF THE PREFERRED EMBODIMENT

Figure 1:
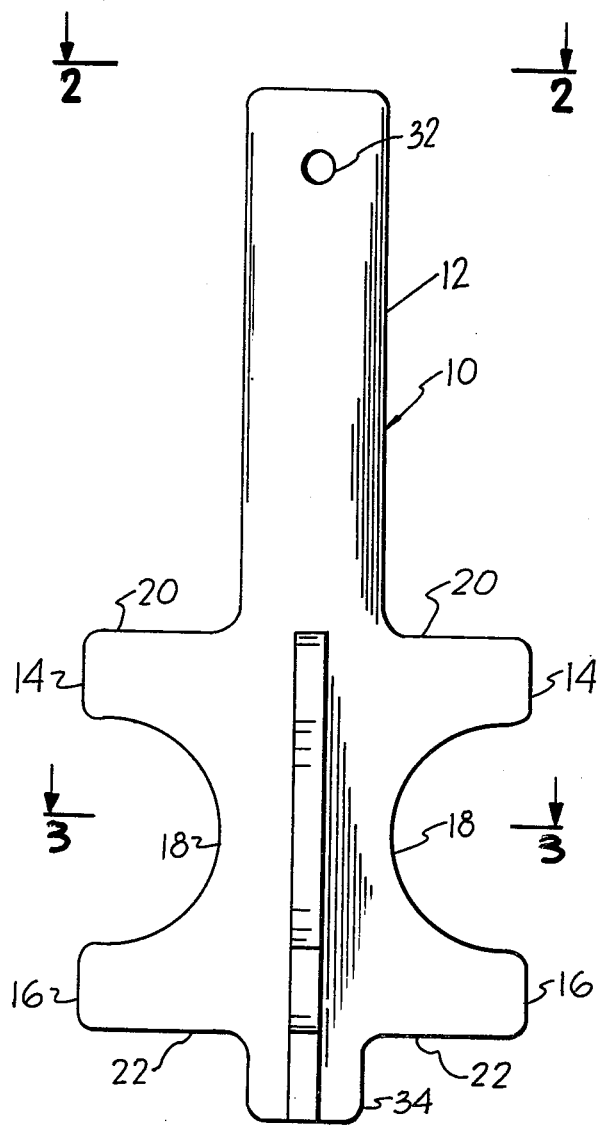
FIG. 1 is a side elevational view of the novel apparatus in accordance with the invention.
Figure 2:
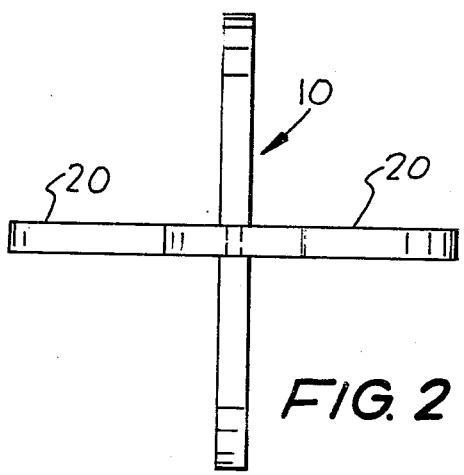
FIG. 2 is a plan view taken along line 2—2 of FIG. 1.
Figure 3:
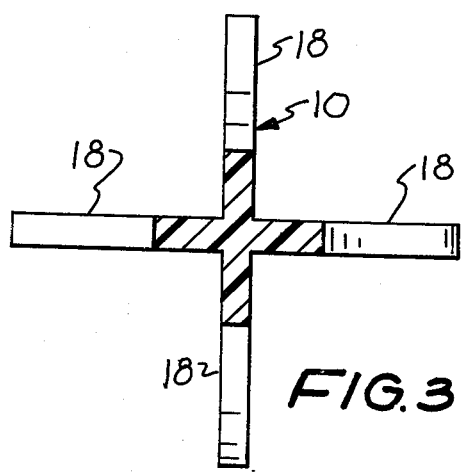
FIG. 3 is a sectional view taken along the line 3—3 of FIG. 1.

Referring now to FIGS. 1, 2 and 3 there is shown a tool 10 in accordance with the invention. The tool 10 comprises a first generally planar elongated blade 12 having a plurality of fins 14, 16, which extend transversely to the axis of the blade 12. In the form shown an arcuate edge 18 extends from one fin 14 to adjacent fin 16. The opposite edges of fins 14 and 16 are respectively straight edges 20, 22.

Carried at right angles and in fixed relationship to the first generally planar blade 12 is a second generally planar blade 30 which in the preferred embodiment will have an outline identical to the lower extremity of the first blade 12. The upper portion of the blade 12 is contoured for holding by the operator and has a hole 32 for hanging. At the other extremity of the tool 10 is a boss 34 which is configured for engagement with the axis (not shown) of the blender blade (not shown) without damage either to the blender or to the tool 10.

Figure 4:
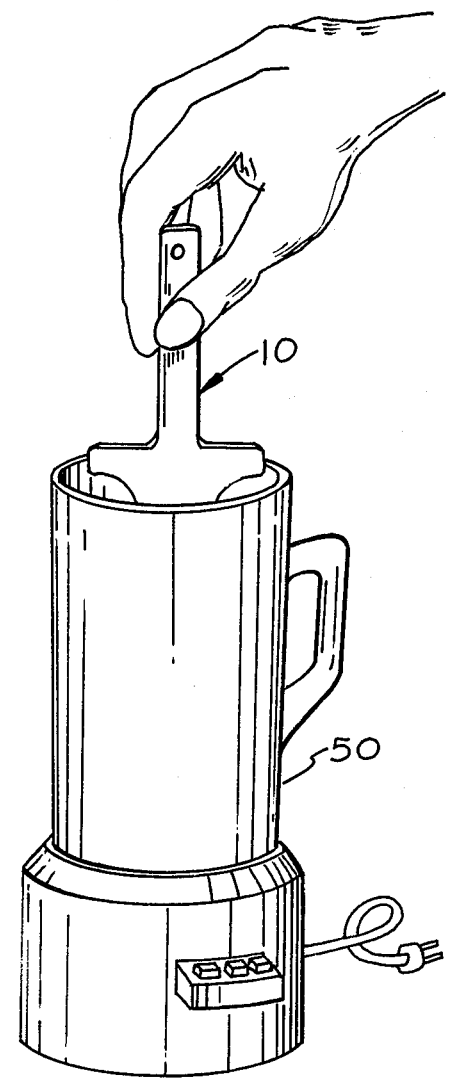
FIG. 4 is a perspective view showing the use of the tool in accordance with the invention in conjunction with a blender.

Referring to FIG. 4 there is shown the use of the apparatus when the tool 10 is urged axially into a blender 50.

When the tool 10 is manufactured of a transparent plastic such as Lucite or Plexiglass the operator will have maximum visibility and thereby tend to avoid injury either to the tool 10 or the blender 50. In addition the device will be easy to clean. Other alternatives will be apparent to those skilled in the art without departing from the spirit of the invention.

Having herein described the invention, what is claimed as new is:

1. A tool for use in packing a blender which comprises an elongated flat handle member, a first generally planar elongated blade integrally formed with said handle member and having a plurality of transversely extending fins, a second generally planar elongated blade fixedly carried at right angles to said first generally planar elongated blade and having a plurality of transversely extending fins whereby said first and second blades cooperate to urge foodstuffs into a blender.

2. The apparatus as described in claim 1 wherein each fin on said first generally planar elongated blade is disposed at the same axial position as each fin on said second generally planar elongated blade.

3. The apparatus as described in claim 1 wherein an arcuate edge is disposed intermediate said fins on said blades.

4. The apparatus as described in claim 1 wherein two fins extend transversely on each blade and each fin has a straight peripheral surface.

5. The apparatus as described in claim 4 further including a straight upper surface on each fin.

6. The apparatus as described in claim 1 further including a boss disposed at the lower extremity of the junction of said first and said second generally planar elongated blades.

7. The apparatus as described in claim 6 wherein said tool is manufactured of transparent plastic material.

8. The apparatus as described in claim 7 wherein said tool is manufactured of Lucite.

9. The apparatus as described in claim 7 wherein said tool is manufactured of Plexiglass.

* * * * *